US008036641B2

(12) United States Patent
Hovestadt et al.

(10) Patent No.: US 8,036,641 B2
(45) Date of Patent: *Oct. 11, 2011

(54) METHOD FOR OPERATING A PLAYBACK UNIT IN A VEHICLE, FOR PLAYING BACK DATA STORED ON A DATA MEDIUM

(75) Inventors: Guido Hovestadt, Karlsruhe (DE); Dirk Lappe, Karlsruhe (DE); Stefan Wolf, Mühltal (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 133 days.

This patent is subject to a terminal disclaimer.

(21) Appl. No.: 11/444,974

(22) Filed: Jun. 1, 2006

(65) Prior Publication Data

US 2007/0136771 A1 Jun. 14, 2007

(51) Int. Cl.
*H04M 1/64* (2006.01)
(52) U.S. Cl. .................. 455/412.1; 455/3.06; 455/414.1
(58) Field of Classification Search .............. 455/412.1, 455/3.06, 414.1, 403, 407–408, 550.1, 552.1, 455/557, 566; 379/76; 369/30.01, 30.04, 369/30.06, 47.1, 59.23; 725/62–64, 75, 87; 348/14.01–4
See application file for complete search history.

(56) References Cited

U.S. PATENT DOCUMENTS

| | | | |
|---|---|---|---|
| 4,870,515 A | 9/1989 | Stokes | |
| 4,872,151 A | 10/1989 | Smith | |
| 5,479,479 A | 12/1995 | Braitberg et al. | |
| 5,502,497 A * | 3/1996 | Yamaashi et al. | 348/473 |
| 5,706,211 A * | 1/1998 | Beletic et al. | 709/206 |
| 5,732,324 A | 3/1998 | Rieger, III | |
| 5,751,672 A | 5/1998 | Yankowski | |
| 5,784,006 A | 7/1998 | Hochstein | |
| 5,794,164 A | 8/1998 | Beckert et al. | |
| 5,806,018 A | 9/1998 | Smith et al. | |
| 5,809,115 A | 9/1998 | Inkinen | |
| 5,862,488 A * | 1/1999 | Kotzin et al. | 455/510 |
| 5,914,941 A * | 6/1999 | Janky | 370/313 |
| 5,916,024 A | 6/1999 | Von Kohorn | |
| 5,970,390 A | 10/1999 | Koga et al. | |

(Continued)

FOREIGN PATENT DOCUMENTS

DE 41 25 874 2/1993

(Continued)

*Primary Examiner* — Cong Tran
(74) *Attorney, Agent, or Firm* — O'Shea Getz P.C.

(57) ABSTRACT

A system for use in a motor vehicle includes a wireless receiver that receives, over a wireless communication channel, supplemental information representative of the characteristics of the contents of a playback media, and provides received supplemental information indicative thereof. A playback device receives the received supplemental information and stores the received supplemental information in a non-volatile memory device. The playback unit may generate a request for supplement information in response to and indicative of a playback media inserted into the playback unit. The system may also include a wireless transmitter that receives the request and transmits the received request over the communication channel. In another embodiment, a radio connection is established between a computing device and the wireless receiver. The computing device transmits characteristic data of selected data media over the radio connection to the wireless receiver, which provides the received data to the playback unit that stores the received data in a memory device for subsequent on-demand retrieval and display. In this embodiment, an operator can transfer to the motor vehicle the characteristic data stored in the computing device (e.g., personal computer) relating to selected data media.

12 Claims, 1 Drawing Sheet

U.S. PATENT DOCUMENTS

| | | | |
|---|---|---|---|
| 5,977,964 A | 11/1999 | Williams et al. | |
| 5,987,323 A | 11/1999 | Huotari | |
| 5,991,640 A | 11/1999 | Lilja et al. | |
| 6,028,537 A * | 2/2000 | Suman et al. | 340/988 |
| 6,034,925 A | 3/2000 | Wehmeyer | |
| 6,101,387 A | 8/2000 | Granberg et al. | |
| 6,169,955 B1 | 1/2001 | Fultz | |
| 6,246,672 B1 * | 6/2001 | Lumelsky | 370/310 |
| 6,271,455 B1 * | 8/2001 | Ishigaki et al. | 84/605 |
| 6,334,061 B1 | 12/2001 | Cunningham et al. | |
| 6,493,430 B2 | 12/2002 | Leuca et al. | |
| 6,527,641 B1 | 3/2003 | Sinclair et al. | |
| 6,563,769 B1 * | 5/2003 | Van Der Meulen | 369/30.06 |
| 6,563,805 B1 | 5/2003 | Ma et al. | |
| 6,564,003 B2 * | 5/2003 | Marko et al. | 386/69 |
| 6,701,161 B1 * | 3/2004 | Wendling | 455/556.1 |
| 6,728,531 B1 | 4/2004 | Lee et al. | |
| 6,993,134 B1 * | 1/2006 | Epstein | 380/262 |
| 7,272,843 B1 * | 9/2007 | Nejime et al. | 725/32 |
| 2001/0053943 A1 | 12/2001 | Kaneko et al. | |
| 2002/0056142 A1 * | 5/2002 | Redmond | 725/151 |
| 2008/0155616 A1 * | 6/2008 | Logan et al. | 725/93 |

FOREIGN PATENT DOCUMENTS

| | | | |
|---|---|---|---|
| DE | 197 27 325 | 3/1999 | 23/6 |
| DE | 197 37 322 | 3/1999 | 1/8 |
| DE | 197 50 372 | 5/1999 | 15/163 |
| DE | 199 17 169 | 11/2000 | 1/38 |
| EP | 0 777 106 | 6/1997 | 21/20 |

* cited by examiner

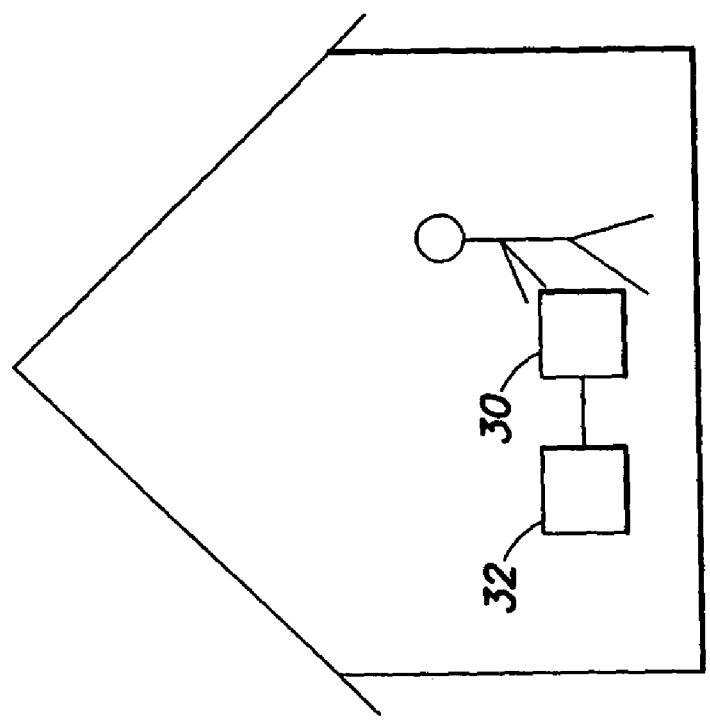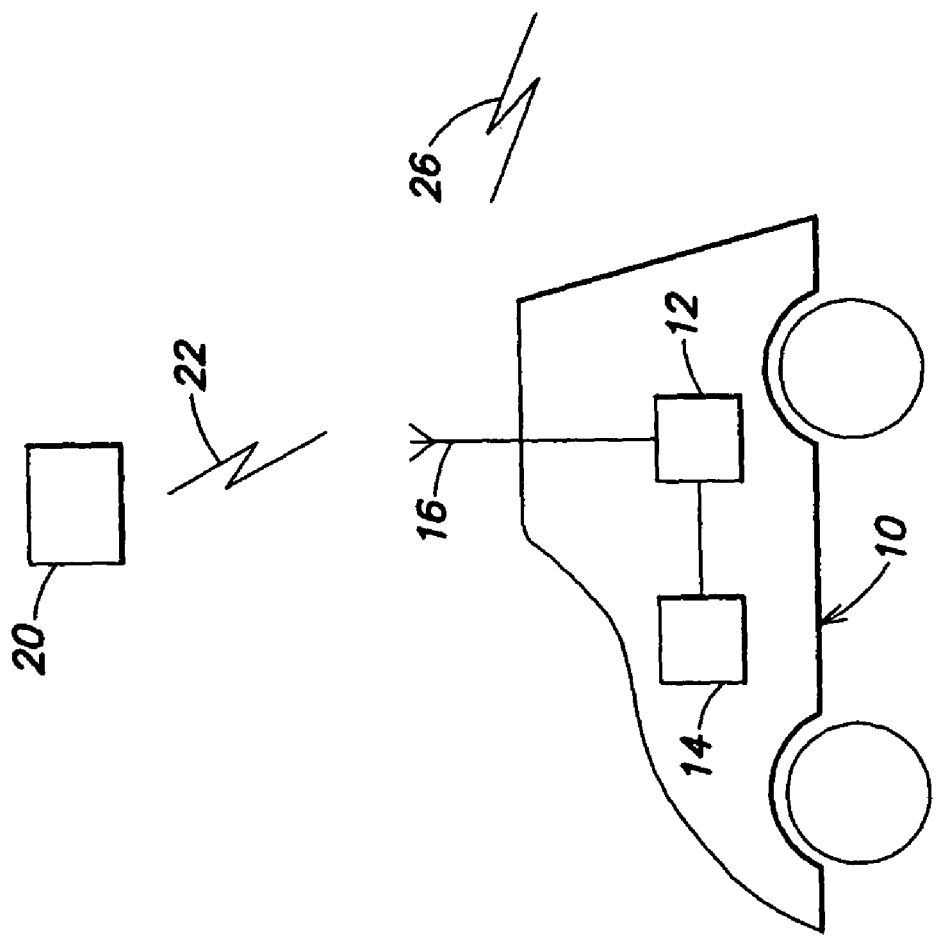

METHOD FOR OPERATING A PLAYBACK UNIT IN A VEHICLE, FOR PLAYING BACK DATA STORED ON A DATA MEDIUM

BACKGROUND OF THE INVENTION

The present invention relates to the field of multimedia devices for use in a motor vehicle, and in particular to motor vehicle multimedia devices that receive over a wireless connection supplemental information regarding a data medium suitable for playback in the multimedia device.

Motor vehicles are often equipped for example with a car radio, a multimedia player, an audio cassette player, and a car telephone. A combination of car telephone and car radio is often referred to as a telematic unit.

The multimedia data medium stores not only the actual multimedia data, but also a table of contents and other supplementary information. An audio or video CD for example, stores the title of the CD, the music titles stored on it, the beginning or end times, and the size of the stored files. This information can be read when the data medium is inserted into a multimedia player, and can be displayed on a visual display device (e.g., a liquid crystal display).

A problem with prior art systems is that the driver must look away from the road while he is driving in order to enter instructions into the playback unit. Therefore, for safety reasons, the operation of the playback unit should obviously be avoided while operating the motor vehicle.

Therefore, there is a need for a playback unit for use in a motor vehicle that automatically receives supplemental information regarding a data medium suitable for playback in the playback unit.

SUMMARY OF THE INVENTION

Briefly, according to an aspect of the present invention, a multimedia system for use in a motor vehicle includes a wireless receiver that receives, over a wireless communication channel, supplemental information representative of the characteristics of the contents of a playback media, and provides received supplemental information indicative thereof. A playback device receives the received supplemental information and stores the received supplemental information in a non-volatile memory device.

The playback unit may generate a request for supplement information in response to and indicative of a playback media inserted into the playback unit. The system may also include a wireless transmitter that receives the request and transmits the received request over the communication channel.

In one embodiment, after the data medium has been inserted into the playback unit, the wireless transmitter (e.g., a car telephone) establishes a radio connection to a data server, and at least part of the characteristic data stored on the inserted data medium are read by the playback unit and are transmitted from the wireless transmitter to the data server, which compares these characteristic data with stored data to identify the data medium. After identifying the data medium, the data server transmits supplemental information to the playback unit, which may include more information than the characteristic data stored on the data medium. The received supplemental information is stored in a memory device for on-demand retrieval and display. If the same data medium is placed into the playback unit (e.g., CD player) a second time, its characteristic data are already present in the memory device and can be displayed.

In another embodiment, a radio connection is established between a computing device and the wireless receiver. The computing device transmits characteristic data of selected data media over the radio connection to the wireless receiver, which provides the received data to the playback unit that stores the received data in a memory device for subsequent on-demand retrieval and display. In this embodiment, an operator can transfer to the motor vehicle the characteristic data stored in the computing device (e.g., personal computer) relating to selected data media. For example, a driver remotely located from his motor vehicle (e.g., at home) can conveniently load for example the characteristic data of arbitrary CDs into the memory of his motor vehicle CD player via his personal computer and a wireless communication channel (e.g., a cellular communication channel). The driver does not have to be in, or even be near the motor vehicle for this purpose.

One advantage is that the characteristic data transmitted from the data server to the vehicle can contain much more information about an inserted playback media than is stored on the playback media itself. Depending on the capacity of the memory, the characteristic data of a more or less large number of CDs can be stored. Advantageously, information that supplements/updates information stored on the playback media can be provided to the playback unit over the wireless communication channel.

Notably, displaying the characteristic data automatically after the playback media has been inserted into the playback unit relieves the driver from operating the playback unit.

These and other objects, features and advantages of the present invention will become more apparent in light of the following detailed description of preferred embodiments thereof, as illustrated in the accompanying drawings.

BRIEF DESCRIPTION OF THE DRAWING

The FIGURE is a pictorial illustration of embodiments of the present invention in their operational environment.

DETAILED DESCRIPTION OF THE INVENTION

A motor vehicle 10 includes a wireless transceiver 12 (e.g., a car telephone) and a playback unit 14 (e.g., CD player), which is connected to the wireless transceiver 12. An antenna 16 is connected to the wireless transceiver. The system also includes a data server 20 that communicates via a wireless communication channel 22. A computer 30 and a telephone/modem 32 are situated in the driver's house/office.

After a playback media (e.g., a CD) has been inserted into the playback unit 14, the wireless transceiver 12 transmits characteristic data of the inserted playback media via the antenna 16 to the data server 20. For example, in one embodiment, the transceiver includes a transmitter and a receiver, where the transmitter is configured to receive a request and transmit the received request over a wireless communication channel via the antenna 16. The data server 20 compares the received characteristic data with stored characteristic data resident in the data server, to identify the playback media inserted into the playback unit 14. After this identification, the data server 20 transmits the supplemental characteristic data of the inserted playback media to the vehicle (e.g. to the receiver), where the supplemental data are stored in a memory of the playback device 14, and are automatically displayed on a visual display device within the vehicle.

In an alternative embodiment, an operator may initiate the transmission of the supplemental characteristic data associated with selected playback devices from his computer (e.g., PC, laptop computer, PDA, or other computing device) over a wireless communication channel 26 to the wireless transceiver 12. The supplemental characteristic data received by the wireless transceiver 12 are then forwarded to and stored (e.g., in compressed form) in the memory of the playback device 14.

Advantageously, a user may remotely update (e.g., from home) the memory in the motor vehicle playback unit (e.g., the CD player) via the wireless communication channel 26.

The supplemental characteristic data transmitted to the vehicle can provide descriptive characteristic information about the inserted playback media beyond what are stored on the media itself. The supplemental information may include, for example, ID3 tags. In some embodiments, the supplemental information is encoded in a short-message-services standard (SMS) format.

The present invention is clearly not limited to providing supplemental information regarding CDs. Rather, the present invention may be used with other media, such as for example, DVD, memory cards such as for example a memory stick, and other prerecorded data media. The playback units may include for example CD players, DVD players and/or multimedia players.

Although the present invention has been shown and described with respect to several preferred embodiments thereof, various changes, omissions and additions to the form and detail thereof, may be made therein, without departing from the spirit and scope of the invention.

What is claimed is:

1. A method of operating a playback unit for use in a motor vehicle equipped with a wireless transceiver that communicates with the playback unit, comprising:
    receiving at the playback unit supplemental information representative of characteristics of contents of playback media, where the supplemental information is transmitted by a computing device over the wireless communication channel to the wireless transceiver, which forwards the received supplemental information to the playback unit; and
    storing the received supplemental information in a memory device accessible by the playback unit;
    where the supplemental information supplements the contents of the playback media, and is free of audio data to be audibly reproduced by the playback unit.

2. The method of claim 1, further comprising:
    automatically transmitting a request for supplemental information indicative of the playback media inserted into the playback unit to the data server over the wireless communication channel via the wireless transceiver.

3. The method of claim 2, further comprising retrieving the received supplemental information stored in the memory device and displaying the received supplemental information on a motor vehicle display.

4. The method of claim 3, where the step of automatically transmitting a request for supplemental information comprises transmitting a request for supplemental information from a CD player.

5. The method of claim 3, where the step of automatically transmitting a request for supplemental information comprises transmitting a request for supplemental information from a DVD player.

6. The method of claim 3, where the step of automatically transmitting a request for supplemental information comprises transmitting a request for supplemental information from a multimedia player.

7. The method of claim 3, where the step of automatically transmitting a request for supplemental information is performed in response to inserting a memory card data medium into the playback unit.

8. The method of claim 1, where the step of storing comprises storing the received supplemental information in a compressed format in the memory device.

9. A multimedia system for use in a motor vehicle, comprising:
    a wireless receiver that receives, over a wireless communication channel, supplemental information representative of characteristics of the contents of a playback media, and provides received supplemental information indicative thereof;
    a memory device; and
    a playback device that receives the received supplemental information and stores the received supplemental information in the memory device;
    where the supplemental information supplements the contents of the playback media, and is free of audio data to be audibly reproduced by the playback unit.

10. The multimedia system of claim 9, where the playback unit comprises a display device that displays data indicative of the received supplemental information associated with the playback media.

11. The multimedia system of claim 10, comprising
    means for generating a request for supplemental information indicative of a playback media inserted into the playback unit; and
    a wireless transmitter that receives the request and transmits the received request over the wireless communication channel.

12. A multimedia system for use in a motor vehicle, comprising:
    a wireless receiver that receives, over a wireless communication channel, supplemental information representative of characteristics of the contents of a playback media;
    where the supplemental information supplements the contents of the playback media, and is free of audio data to be audibly reproduced by the playback unit;
    a memory device;
    a playback device that receives the received supplemental information and stores the received supplemental information in the memory device;
    means for generating a request for supplemental information in response to and indicative of a playback media inserted into the playback unit; and
    a wireless transmitter that receives the request and transmits the received request over the communication channel.

* * * * *